(12) United States Patent
Casalini

(10) Patent No.: US 7,052,767 B1
(45) Date of Patent: May 30, 2006

(54) SURFACE-COATED HARD MATERIAL, PRODUCTION METHOD FOR THIS, AND USE OF THE SAME

(76) Inventor: Daniele Casalini, Via Piave 64, I-28845 Domodossola (VB) (IT)

( * ) Notice: Subject to any disclaimer, the term of this patent is extended or adjusted under 35 U.S.C. 154(b) by 134 days.

(21) Appl. No.: 09/621,788

(22) Filed: Jul. 21, 2000

(30) Foreign Application Priority Data

Jul. 19, 1999 (DE) .................................. 199 33 710

(51) Int. Cl.
*B32B 9/04* (2006.01)
(52) U.S. Cl. ........................ 428/405; 428/447; 523/212
(58) Field of Classification Search ................ 428/450, 428/447, 391, 405, 407; 523/212
See application file for complete search history.

(56) References Cited

U.S. PATENT DOCUMENTS

| 4,244,849 | A | * | 1/1981 | Saam ........................ 524/442 |
| 4,430,470 | A | | 2/1984 | Taniguchi et al. |
| 4,518,655 | A | | 5/1985 | Henry et al. |
| 5,182,173 | A | * | 1/1993 | Swei ........................ 428/391 |
| 5,244,958 | A | | 9/1993 | Goodman |
| 5,387,467 | A | * | 2/1995 | Hohner et al. ............. 428/391 |
| 5,543,173 | A | | 8/1996 | Horn, Jr. et al. |
| 5,645,619 | A | * | 7/1997 | Erickson et al. ............. 51/309 |
| 5,991,591 | A | * | 11/1999 | Chen et al. ................ 399/325 |
| 6,510,777 | B1 | * | 1/2003 | Neal ........................ 89/36.05 |

FOREIGN PATENT DOCUMENTS

DE 41 14 770 A1 12/1992
DE 43 36 612 C2 7/1995

* cited by examiner

*Primary Examiner*—Randy Gulakowski
*Assistant Examiner*—Christopher Keehan
(74) *Attorney, Agent, or Firm*—Perkins Smith & Cohen; Jerry Cohen; John Hamilton

(57) ABSTRACT

Surface-coated hard material with a hardness ($HV_{0.2}$) $\geq$10Gpa, the surface of which has a polysiloxane coating. Method for producing this, in which a hard grain is mixed with a polysiloxane, a polysiloxane emulsion, or a diluted polysiloxane emulsion. Use of a hard material of this type as a wear-reducing agent in lacquer coatings.

4 Claims, 3 Drawing Sheets

SURFACE-COATED HARD MATERIAL, PRODUCTION METHOD FOR THIS, AND USE OF THE SAME

FIELD AND BACKGROUND OF THE INVENTION

The present invention relates to a surface-coated hard material, a production method for this material, and use of the same.

It is known that coats of lacquer applied to flooring laminates, genuine wood laminates, parquet, furniture, or to wood or plastic panels in general can have resin added to them in order to make them resistant to wear. When this is done, lacquer systems based on phenol, melamine, aldehyde, formaldehyde, urea, epoxy, polyester and/or polyurethane resins are used. Preferred lacquer systems are the melamine resins. Because of its hardness, transparency, inertness, and availability, aluminum oxide or alumina products in the form of fused corundum, sintered corundum, monocrystalline corundum and/or calcined or sintered alumina such as plate-like alumina are preferred for increasing the wear-resistance of the coatings.

EP 0 732 449 A1 discloses a method for producing wear-resistant laminates, in which the surface of the resin-impregnated paper that is used during the production process is coated with a mixture consisting of melamine resin, cellulose fibers, corundum as the hard material, additives and water, and is dried to a specific residual moisture content. The resin-impregnated paper is processed within the laminate in the usual way. After the laminate has been pressed and the melamine resin has hardened, the corundum is firmly bonded into the resin layer, the wear resistance of which is greatly increased because of the hardness of the corundum. DE 195 29 987 A1 discloses a method for producing highly wear-resistant lacquer coatings on a solid carrier, when wear-reducing material is either scattered directly onto the surface of the carrier and then covered with a synthetic-resin lacquer (acrylate resin, polyester resin, or polyurethane resin lacquer), or the wear-reducing agent is J scattered onto the surface of the carrier that is already coated with lacquer. Generally speaking, when this is done, the wear-reducing effect of the resin increases as the grain size increases and as the degree to which the lacquer coating is filled increases. The maximum grain size that can be used, which is, at the same time, the optimal size, is determined by the thickness of the lacquer coating. However, the optimal degree of filling does not correspond to the possible maximum but is limited by the simultaneous demand for the highest possible degree of transparency of the lacquer coating. The subsequent pressing and hardening of the lacquer is effected by using known technology. One additional variant that is available in particular for laminates is that a transparent overlay paper that incorporates the appropriate resin is impregnated with lacquer then pressed onto the decorative layer and hardened. It is preferred that corundum be used as the wear-reducing agent. Synthetic corundum is usually produced in an arc furnace, when the starting material—alumina or bauxite—is smelted at approximately 2000° C. In this process, the product is in the form of large blocks weighing several tonnes, and after cooling these are crushed and then processed into granular material. Typical areas of use for granular corundum, which is available in the most varied grades and grain sizes ranging from a few millimeters to several micrometers, are as grinding agents and refractory products. Because of its brittle-fracture behaviour, when the corundum is ground this results in a markedly fissured surface with many edge dislocations, micro-edges, grooving, and cracks. Similar grain surfaces with additional pores also seen in sintered or calcined alumina, particularly if they have been previously subjected to a grinding process. Grain surfaces of this kind display a high degree of capillarity with respect to low-viscosity liquids. Such grain characteristics have been found to be disadvantageous when processing aluminum oxide to form wear-resistant coatings.

According to the current state of the art, today, a wear-resistant lacquer coating is produced by a single application of the wear-reducing lacquer to which the hard granular material has already been mixed, subsequent drying, and pressing. When this is done, the particles of hard material lie, in part, directly on the surface of the protective coating so that, for example, dyes or other coloured liquids with a high of level of creepage penetrate irreversibly into the micro-capillaries of these hard material particles thereby causing patches that cannot be removed from the laminate or lacquer surface. Attempts that have been made to avoid this effect by using low-viscosity lacquer systems that cover the whole of the granular material surface have been unsuccessful, since a minimum degree of viscosity is needed in order to achieve the desired thickness of the lacquer coating.

A further disadvantage of the markedly fissured surfaces of the hard granular material that cannot be completely wetted with lacquer is the fact that light is scattered diffusely on the above-discussed micro-edges, cracks, and edged displacements so that the transparency of the lacquer coating that is filled with aluminum oxide is degraded. However, a high degree of transparency is one of the most important criteria for these coatings, which are frequently used in applications in which the visual effect plays a major role. In addition to this, small air bubbles can accumulate on these micro-edges and cracks, and this causes an additional defuse scattering of the light, with the result that transparency is still further degraded.

Thus, it is the objective of the present invention to describe granular hard material that does not suffer from the disadvantages described heretofore.

SUMMARY OF THE INVENTION

Advantageous variations—of the present invention are set out in the secondary claims.

This is realized concretely by a hard material with a hardness $(HV_{0.2}) \geq 10$ GPa, the surface of which is covered with a polysiloxane coating.

It is preferred that the treatment of the hard material be effected with a polysiloxane solution of the following formula:

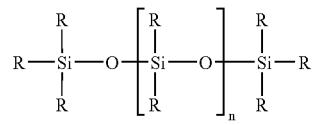

wherein the R radical can in each instance by a hydrogen, alkyl and/or phenyl group, and n stands for an integer from 1 to 100. Especially good results are achieved if the organic R radical is a methyl group.

Surface treatments or coatings with particles of hard materials have been known for a considerable time and are used for the most varied purposes. For instance, EP 0 387 748 describes a hydrophobically coated grinding grain that is based on corundum and/or silicon carbide, the surface of which is treated with highly dispersed hydrophobic silicon oxide so that the strength with which the grain is bonded into the synthetic resin is improved. Similarly, according to EP 304 616, an improvement of the bonding of grinding grains in a plastic resin system is achieved by surface treatment with hygroscopic and/or hydrophobic substances. In addition, this treatment entails the additional effect that granular material treated in this way disperses better in the electrostatic field.

It is also usual to coat the grains with a binder and a pigment in order to increase the surface area of the grain, thereby once again enhancing the way in which the grain is bound in when grinding agents are manufactured. This coating also has the effect of simultaneously improving the dispersability of the granular material. However, none of the above treatments can compensate for the disadvantages of aluminum oxide when it is used in lacquer coatings or laminates (a high degree of capillarity as compared to low-viscosity liquids and diffuse dispersion of the light).

On the other hand, if one mixes hard granular material based on aluminum oxide with polysiloxanes or corresponding emulsions or solutions, because of the outstanding creep behaviour of the polysiloxanes one achieves complete coating of the surface of the individual grains, when the micro-edges, cracks, grooves, and offset edges are covered over or filled so that low-viscosity liquids can no longer penetrate into the grain and there is no longer any diffuse dispersion of light on the cracks or edges.

Hard material based on-aluminum oxide can be electro-smelted corundum, monocrystalline corundum, sintered corundum, tabular alumina, calcined or sintered alumina products, such as plate-form alumina, or mixtures of these. There are no restrictions as to the size of the grain for the hard material that is to be used. Depending on the requirement and the application, both micro- as well as macro-granular material can be treated according to the present invention. However, the hardness of the hard grains should have a minimum value of 10 GPa, preferably 15 GPa, in order to provide adequate protection against wear. The J processing itself is effected in the known manner by spraying on an appropriate polysiloxane solution or emulsion or by mixing the hard material with a polysiloxane solution or emulsion in suitable mixers (tumbling mixers, rotary mixers, staggered-baffle drum mixers, and/or intensive mixers). Depending on the moisture content of the starting granular material, it has been found advantageous to subject the material to heat treatment in a temperature range between 100° C. and 600° C. immediately prior to the coating process, in order to eliminate any moisture that is adhering to the surface, including the pores and cracks. The quantity and concentration of the polysiloxane solution must be so selected that the complete surface of each individual grain is covered once it has been treated. The finer the grain size of the material that is to be treated the greater will be the quantity of polysiloxane that will have to be used. For reasons of economy, it is best at to apply a complete coating that is as thin as possible. The quantities of polysiloxane that will be required for a complete coating line between 0.001 and 10%-wt, mostly between 0.1 and 5%-wt, relative to the hard material that is used. For the reasons given heretofore, it is preferred that the quantity of polysiloxane that is used during the treatment range between 0.5 and 1.5 percent by weight relative to the hard material that is used. The quantity used will depend on the grain size or the specific surface area of the grinding grain. The advantageous effect varies very little even if the optimal quantities are exceeded over a relatively large range. The viscosity of the polysiloxane or of the corresponding emulsion or solution that is used should not exceed 1500 mpa*s at room temperature in order to achieve the optimal effect of the coating.

In addition to improved visual properties of the lacquer and laminate coatings, most surprisingly, when the hard material treated according to the present invention was incorporated it was found that the resistance to wear of these layers is higher than comparable layers in which untreated hard material is incorporated. Resistance to wear was determined using the Taber method, whereby a test body is rotated beneath loaded, cylindrical adhesive wheels that are covered with defined abrasive paper and the number of rotations required in order to achieve a specific degree of wear is then measured.

One possible explanation for this surprising effect maybe the good gliding quality and lubricating quality of the polysiloxane. The wear test itself is nothing more than a lubricant such as oil when grinding is a generally known technique that is used in order to reduce the coefficient of friction between the material and the grinding agent and thus reduce the aggressiveness of the grinding agent. In the present case it is possible that the effect of the grinding paper is reduced and wear on the lacquer or laminate layer is also reduced.

DETAILED DESCRIPTION OF PREFERRED EMBODIMENTS

The present invention will be described in greater detail below on the basis of embodiments without necessarily being restricted to these.

EXAMPLES 1–5

1 kg pure white corundum (Alodur@ WSK, Treibacher Schleifmittel), F 280 granulation, was tempered at 4000° C. and then sprayed with a diluted, aqueous polysiloxane emulsion (Baysilone® oil emulsion H, Bayer Leverkusen) when in a drum mixer, after which it was mixed intensively for 20 minutes. The coated granular material was then dried for 20 minutes at 1200° C. in a convection oven. Subsequently, the total content Of SiO2 and the proportion of polysiloxane on the surface of the grains was determined.

TABLE 1

| | Concentration series | | |
|---|---|---|---|
| Ex. | Baysilone Oil Emulsion H | Total content $SiO_2$ (%-wt) | Content (%-wt) polydimethylsiloxane |
| 1 | 1 ml in 15 ml $H_2O$ | 0.032 | 0.025 |
| 2 | 5 ml in 15 ml $H_2O$ | 0.135 | 0.128 |
| 3 | 15 ml (undiluted) | 0.589 | 0.582 |
| 4 | 30 ml (undiluted) | 1.309 | 1.302 |
| 5 | 60 ml (undiluted) | 2.743 | 2.704 |
| 6* | | 0.007 | |

*untreated comparison material

The best results in this series were obtained with Example 4. Descriptions were based on electron microscope imagery and measurements of wear values as compared to untreated granular material.

Figure 1:
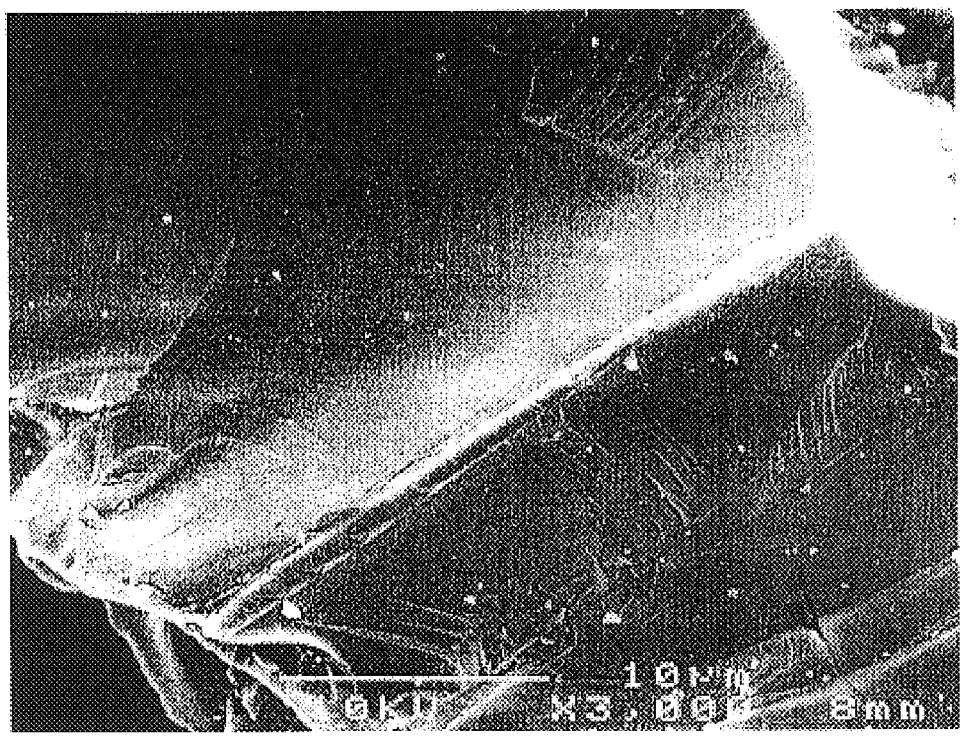
FIGS. 1–4 are photomicrographs of surfaces of untreated hard grain (FIG. 1, 3000×), treated hard grain per the present invention (FIG. 2,3000×), surface of a lacquer coating with untreated hard grains (FIG. 3); and surface of a lacquer coating with hard grains coated via the process of the invention (FIG. 4).
Figure 2:
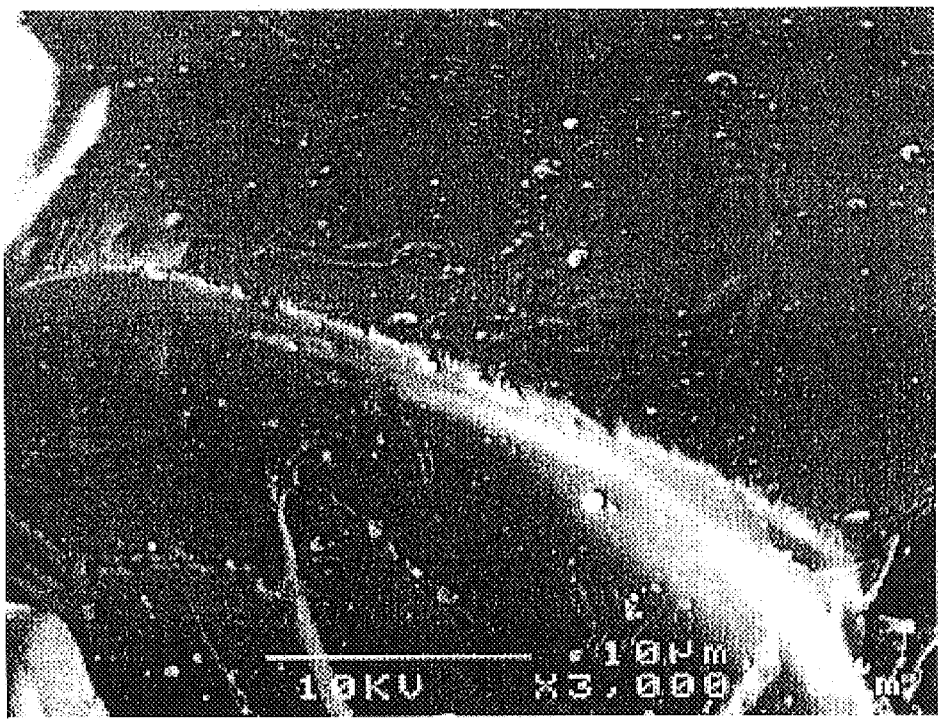
Figure 3:
Figure 4:

FIG. 1 shows the untreated granular material (Example 6) with a very finely structured and fissured surface. In comparison to this, FIG. 2 shows the grain surface (Example 4), which is completely covered by the coating according to the present invention. The cracks are closed and have been filled to a large extent. The edges are rounded, and no more edge displacements can be seen. FIGS. 3 and 4 in the Appendix serve to document the effect of the coating according to the present invention on the transparency of a lacquer coating. Whereas the uncoated grains (Example 6) can be clearly seen in the lacquer coating, and a relatively large number of intra-crystalline optical refractive edges can be seen, the hard grains coated according to the present invention, shown in [Illustration] FIG. 4, can only be identified poorly by the grain resin boundary. There are absolutely no intra-crystalline visual refractive edges to be seen.

Table 2 sets out the IP wear values as determined by Draft Standard prEN 13329:1998, Appendix F.

TABLE 2

Wear values

| Example | IP Average value from three test bodies | wear resistance compared to untreated grain |
|---|---|---|
| 1 | 2200 | 105% |
| 2 | 2200 | 105% |
| 3 | 2300 | 1090-. |
| 4 | 2500 | 119% |
| 5 | 2500 | 119% |
| 6* | 2100 | 100% |

The test bodies that contained the coated hard grain (Example 4) according to the present invention display enhanced wear resistance that is 19% greater as compared to Example 6.

What is claimed is:

1. Surface coated hard material comprising single hard grain material selected from the group consisting of electro-corundum, monocrystalline corundum, sintered corundum, sintered alumina, calcined alumina, or mixtures of these, said hard material having a hardness $(HV_{0.2}) \geq 15$ GPa, the surface of which has a polysiloxane coating in an amount from 0.001 to 10%-wt relative to the hard material and of the formula:

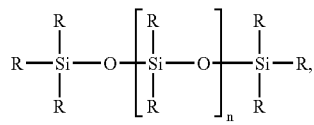

where R is hydrogen, an alkyl and/or phenyl group and n is an integer between 1 and 100.

2. The surface coated hard material as defined in claim 1, wherein the R radical is preferably a methyl group.

3. The surface coated hard material as defined in claim 1, wherein the quantity of the polysiloxane amounts to 0.01 to 5%-Wt relative to the hard material that is used.

4. The surface coated hard material as defined in claim 1, wherein the quantity of the polysiloxane amounts to 0.1 to 1.5%-wt relative to the hard material that is used.

* * * * *